UNITED STATES PATENT OFFICE

2,640,854

PROCESS FOR THE PRODUCTION OF AN AROMATIC AMINO HYDROXY ACID

Leonard Doub, Detroit, Mich., assignor to Parke, Davis & Company, Detroit, Mich., a corporation of Michigan No Drawing. Application September 8, 1950, Serial No. 183,894

3 Claims. (Cl. 260—575)

This application is a continuation-in-part of my copending application Serial No. 121,447, filed October 14, 1949, now U. S. Patent 2,540,104, and the invention relates to a unit process for the production of an aromatic amino hydroxy acid from a cheap and readily available dihydric phenol. More particularly, the invention relates to a unit process for the preparation of 4-amino-2-hydroxybenzoic acid from resorcinol.

4-amino-2-hydroxybenzoic acid has recently attained commercial importance due to the discovery of its efficacy in the treatment of tuberculosis. Several different methods have been proposed for the commercial preparation of this valuable chemical from readily available starting materials. However, most of these processes are both expensive and laborious due to the many steps involved and are therefore unsuitable for the commercial production of the desired amino hydroxy acid. One of the most feasible and widely used commercial methods is a two-step process. This process consists in reacting resorcinol with ammonia at an elevated temperature and pressure in the presence of water and ammonium phosphate or ammonium arsenate catalyst to produce m-aminophenol which is isolated and purified. The m-aminophenol is then reacted with a water-soluble bicarbonate in an aqueous medium under pressure and at an elevated temperature in the presence of gaseous carbon dioxide. This method has several obvious disadvantages. It requires the isolation and purification of the m-aminophenol which entails considerable expense and loss of product. The yield in the second step of the process is not high and the product contains a considerable quantity of a dicarboxylic acid by-product which is difficult to remove.

In my copending application referred to above I have disclosed and claimed a method for improving the yield in the second step of the process and practically eliminating the formation of the dicarboxylic acid by-product by the use of a boric acid catalyst.

The present invention is directed to a unit process whereby resorcinol is converted to 4-amino-2-hydroxybenzoic acid in high yields without isolation and purification of the intermediate m-aminophenol.

In accordance with the invention, resorcinol is reacted with ammonia at an elevated temperature and pressure in an aqueous medium in the presence of boric acid and the m-aminophenol so produced in situ reacted, without isolation or purification, with a water-soluble bicarbonate at an elevated temperature under a positive pressure of gaseous carbon dioxide.

In carrying out the process at least one mole of boric acid should be used for each mole of resorcinol. There is no critical upper limit on the amount of boric acid which can be used for as much as 4 to 5 moles per mole of resorcinol have been used without deleterious effect upon the yield of the final product. The optimal results are obtained when about 1.8 to 2.2 moles of boric acid are used for each mole of resorcinol.

In the first phase of the process at least two moles of ammonia and one mole of water should be used for each mole of resorcinol. In most instances it is, of course, preferable to employ larger amounts of both of these materials but the upper limits are not too critical. If desired, the ammonia and water can be supplied to the reaction mixture in the form of ammonium hydroxide.

The temperature during the first phase of the process should be kept between about 150 and 225° C. Best results are obtained using a temperature between 190 and 210° C. The pressure can be varied from about 200 lbs. per sq. in. to several thousand lbs. per sq. in. In general, a pressure in the neighborhood of 450 to 600 lbs. per sq. in. is preferable. Increasing the pressure above this range does not appear to materially increase the yield while the use of pressures below this range results in lower yields.

The reaction time can also be varied during the first phase of the process but it is more or less dependent upon the temperature and pressure employed. Under optimal conditions the reaction is usually complete in about ten hours. An increase in the reaction time above ten hours only results in a small increase in yield while a shorter reaction time does not produce the maximum yield.

After the first phase of the process is completed, the ammonia is vented from the reaction chamber and the water-soluble bicarbonate and gaseous carbon dioxide added. Best results are obtained in this second part of the process when the concentration of the water-soluble bicarbonate is maintained near its maximum solubility. The more water-soluble bicarbonates such as ammonium bicarbonate and the alkali metal bicarbonates are preferred. The bicarbonate can be added to the reaction mixture as such or generated in situ by the action of the gaseous carbon dioxide on ammonium or alkali metal hydroxides or carbonates. One of the simplest ways to carry out the process of the invention is to simply remove the gaseous ammonia at the end of the first phase of the process and introduce gaseous carbon dioxide into the reaction chamber to form the ammonium bicarbonate in situ. Another modification is to generate the carbon dioxide gas in situ by simply using an excess of the water-soluble bicarbonate. On heating the mixture, sufficient carbon dioxide is evolved to carry out the reaction.

In carrying out the second phase of the process the temperature can be varied between about 60 and 200° C. with the best results being obtained at 70 to 120° C. The carbon dioxide pressure can be varied from a few lbs. per sq. in. to several thousand lbs. per sq. in. In general, a pressure above 20 lbs. per sq. in. should be used. The optimal pressure from the practical standpoint for low pressure equipment is about 60 to 80 lbs. per sq. in. However, where high pressure equipment is available slightly higher yields can be obtained by increasing the carbon dioxide pressure to several hundred pounds per sq. in.

The reaction time for this portion of the process varies with the temperature and pressure. Decreasing the temperature and pressure increases the reaction time while increasing the temperature and pressure lessens the reaction time. In general, this phase of the process requires about twenty to forty-eight hours.

The invention is illustrated by the following examples.

Example 1

A mixture consisting of 165 g. of industrial grade resorcinol, 186 g. of boric acid and 405 cc. of concentrated ammonium hydroxide (29.6%) is placed in an autoclave equipped with a stirrer. The mixture is heated at 200° C. for ten hours during which time the pressure in the vessel is 600–650 lbs. per sq. in. The mixture is allowed to cool to room temperature and most of the ammonia removed in vacuo. Water is added to the mixture to bring it to the original level. 330 g. of potassium bicarbonate is added and the reaction vessel sealed. The mixture is heated under 300 lbs. of carbon dioxide pressure at 110° C. for twenty hours. The mixture is cooled to room temperature, diluted with 1 liter of water and added cautiously with stirring to 1 liter of cold concentrated hydrochloric acid. The mixture is cooled to 0–5° C. and the precipitate collected. The precipitate is suspended in 1 liter of 9% hydrochloric acid, the mixture cooled to 0–5° C. and the precipitate collected. The precipitate which consists of the hydrochloride salt of 4-amino-2-hydroxybenzoic acid is suspended in a solution consisting of 900 cc. of methanol and 100 cc. of concentrated hydrochloric acid, the mixture cooled to 0–5° C. and the product collected. The acid-methanol wash is repeated, the insoluble hydrochloride salt washed with anhydrous ether and then dried in vacuo; M. P. with dec. about 214° C.; yield, 200 g., or 70%. The free base of 4-amino-2-hydroxybenzoic acid is obtained by treatment of the hydrochloride salt with one equivalent of alkali preferably in the presence of a phosphate buffer.

Example 2

A mixture consisting of 165 g. of industrial grade resorcinol, 186 g. of boric acid and 360 cc. of concentrated ammonium hydroxide is heated in a pressure vessel at 200° C. for ten hours. The ammonia pressure during the reaction is 425 lbs. per sq. in. The reaction mixture is cooled to room temperature and most of the ammonia removed in vacuo. The mixture is restored to its original volume with water and 330 g. of potassium bicarbonate added. The mixture is heated at 110° C. under a carbon dioxide pressure of 250 lbs. per sq. in. for twenty hours. The reaction mixture is cooled and the product isolated as described in Example 1 using the same quantities of reagents, etc. The yield of the hydrochloride salt of 4-amino-2-hydroxybenzoic acid is 174.5 g. or 61%.

Example 3

A mixture consisting of 165 g. of industrial grade resorcinol, 186 g. of boric acid, 205 cc. of concentrated ammonium hydroxide and 200 cc. of water is placed in a pressure vessel and heated at 200° C. for ten hours. The ammonia pressure during the reaction is 300 lbs. per sq. in. The reaction mixture is cooled to room temperature and most of the ammonia removed in vacuo. The mixture is restored to its original volume with water and 330 g. of potassium bicarbonate added. The mixture is heated at 110° C. under 250 lbs. pressure of carbon dioxide for twenty hours. The reaction mixture is cooled and the 4-amino-2-hydroxybenzoic acid isolated as the hydrochloride salt as described in Example 1; yield, 128 g. or 45%.

Example 4

A mixture consisting of 165 g. of industrial grade resorcinol, 186 g. of boric acid and 405 cc. of concentrated ammonium hydroxide is heated in a pressure vessel at 160° C. for twenty hours. The ammonia pressure during this time was 250 lbs. per sq. in. The reaction mixture is cooled and most of the ammonia removed in vacuo. 330 g. of potassium bicarbonate is added and the mixture made up to the original volume with water. The mixture is heated at 110° C. for twenty hours under 150 lbs. pressure of carbon dioxide. The reaction mixture is cooled and the hydrochloride of 4-amino-2-hydroxybenzoic acid isolated as described in Example 1; yield, 31.0 g. or 11%.

Example 5

A mixture consisting of 165 g. of industrial grade resorcinol, 186 g. of boric acid and 405 cc. of concentrated ammonium hydroxide is heated in a pressure vessel at 200° C. for ten hours. The ammonia pressure during this time is about 650 lbs. per sq. in. The reaction mixture is cooled to room temperature and gaseous carbon dioxide gas introduced into the pressure vessel under a pressure slightly greater than atmospheric. After the absorption of carbon dioxide has ceased, the vessel is sealed and heated at 100° C. for twenty-four hours. The reaction mixture is cooled and the hydrochloride salt of 4-amino-2-hydroxybenzoic acid isolated as described in Example 1.

What I claim is:

1. In a process for the production of 4-amino-2-hydroxybenzoic acid from a reaction medium containing m-aminophenol in aqueous medium with a boric acid catalyst, the step of producing said reaction medium which comprises heating under pressure to a temperature between about 150 and 225° C. a mixture of resorcinol and boric acid in an aqueous medium in the presence of ammonia.

2. In a process for the production of 4-amino-2-hydroxybenzoic acid, the step which comprises reacting in an aqueous medium, resorcinol with ammonia in the presence of at least one mol of boric acid for each mol of resorcinol at a temperature between about 150 and 225° C. and under a pressure of at least 200 lbs. per square inch thereby forming m-aminophenol in the reaction medium.

3. In a process for the production of 4-amino-2-hydroxybenzoic acid, the step which comprises reacting in an aqueous medium, resorcinol with ammonia in the presence of 1.8 to 2.2 moles of boric acid for each mole of resorcinol at a temperature between about 190 and 210° C. and under a pressure between about 450 to 600 lbs. per square inch thereby forming m-aminophenol in the reaction medium.

LEONARD DOUB.

References Cited in the file of this patent

UNITED STATES PATENTS

| Number | Name | Date |
|---|---|---|
| 2,376,112 | Bean et al. | May 15, 1940 |
| 2,540,104 | Doub | Feb. 6, 1951 |

FOREIGN PATENTS

| Number | Country | Date |
|---|---|---|
| 12,191 | Great Britain | 1889 |